United States Patent
Akiyama

(10) Patent No.: US 8,533,351 B2
(45) Date of Patent: Sep. 10, 2013

(54) DATA RECEPTION PROCESSING APPARATUS, IMAGE FORMING APPARATUS, AND DATA RECEPTION PROCESSING METHOD

(75) Inventor: Atsushi Akiyama, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 560 days.

(21) Appl. No.: 12/904,097

(22) Filed: Oct. 13, 2010

(65) Prior Publication Data

US 2011/0087793 A1  Apr. 14, 2011

Related U.S. Application Data

(60) Provisional application No. 61/251,532, filed on Oct. 14, 2009.

(51) Int. Cl.
G06F 15/16 (2006.01)

(52) U.S. Cl.
USPC .......................................... 709/230; 358/1.15

(58) Field of Classification Search
USPC .......................................... 709/230; 358/1.15
See application file for complete search history.

(56) References Cited

U.S. PATENT DOCUMENTS

| | | | |
|---|---|---|---|
| 7,616,334 B2 * | 11/2009 | Niitsuma | 358/1.15 |
| 2002/0015182 A1 * | 2/2002 | Akiyama et al. | 358/1.15 |
| 2007/0283031 A1 * | 12/2007 | Yoshida | 709/230 |
| 2008/0174792 A1 * | 7/2008 | Nishi | 358/1.6 |
| 2009/0080010 A1 * | 3/2009 | Nanaumi | 358/1.13 |
| 2009/0193133 A1 * | 7/2009 | Torii | 709/230 |
| 2009/0231618 A1 * | 9/2009 | Akiyama | 358/1.15 |
| 2009/0307752 A1 | 12/2009 | Ohashi | |
| 2010/0302584 A1 * | 12/2010 | Watanabe | 358/1.15 |

FOREIGN PATENT DOCUMENTS

| | | |
|---|---|---|
| JP | 2000215009 | 8/2000 |
| JP | 2007140972 | 6/2007 |
| JP | 2007208448 | 8/2007 |

* cited by examiner

Primary Examiner — Wing F Chan
Assistant Examiner — Razu Miah
(74) Attorney, Agent, or Firm — Turocy & Watson, LLP

(57) ABSTRACT

A data reception processing apparatus includes: a data receiving section configured to receive processing target data; plural data acquiring sections configured to respectively acquire only data received by communication employing acquisition target protocols separately set in advance for the data acquiring sections; a data-acquisition control section configured to control the plural data acquiring sections to cause the data acquiring section corresponding to the acquisition target protocol used for reception of data received by the data receiving section to more preferentially receive the data than data received by using the acquisition target protocol corresponding to priority lower than priority associated with the acquisition target protocol used for the reception of the data; and a data output section configured to acquire the data from the data acquiring section and sequentially output the data to a processing section configured to process the data.

18 Claims, 11 Drawing Sheets

FIG.4

| Protocol | PRIORITY |
|---|---|
| RawTCP | SECOND |
| LPD | FIRST |
| IPP | — |
| FTP | — |
| Netware | — |
| ... | ... |

DATA RECEPTION PROCESSING APPARATUS, IMAGE FORMING APPARATUS, AND DATA RECEPTION PROCESSING METHOD

CROSS-REFERENCE TO RELATED APPLICATIONS

This application is based upon and claims the benefit of priority from U.S. provisional application 61/251,532, filed on Oct. 14, 2009; the entire contents of which are incorporated herein by reference.

FIELD

Embodiments described herein relate generally to a technique for efficiently processing data according to priority of processing for the data.

BACKGROUND

In the past, an image forming apparatus that executes network print via a LAN (Local Area Network), the Internet, or the like conforms to various kinds of network protocols and can receive data transmitted using a protocol corresponding to the data and perform image formation processing.

Among a large number of protocols to which the image forming apparatus conforms, there are protocols not in use or used less frequently. Therefore, to realize efficiency of processing performance of the image forming apparatus, there is a technique for turning off a function for recognizing the protocols not in use.

However, efficiency of processing in the image forming apparatus cannot be sufficiently realized simply by turning off the function for recognizing the protocols not in use.

DESCRIPTION OF THE DRAWINGS

FIG. 4 is a data table of an example of priority setting information;

DETAILED DESCRIPTION

In general, according to an embodiment, a data reception processing apparatus includes a data receiving section, plural data acquiring sections, a data-acquisition control section, and a data output section. The data receiving section receives processing target data. The plural data acquiring sections respectively acquire only data received by communication employing acquisition target protocols separately set in advance for the data acquiring sections. The data-acquisition control section controls the plural data acquiring sections to cause the data acquiring section corresponding to the acquisition target protocol used for reception of data received by the data receiving section to more preferentially receive the data than data received by using the acquisition target protocol corresponding to priority lower than priority associated with the acquisition target protocol used for the reception of the data. The data output section acquires the data from the data acquiring section and sequentially outputs the data to a processing section configured to process the data.

Embodiments are explained below with reference to the accompanying drawings.

First Embodiment

Figure 1:
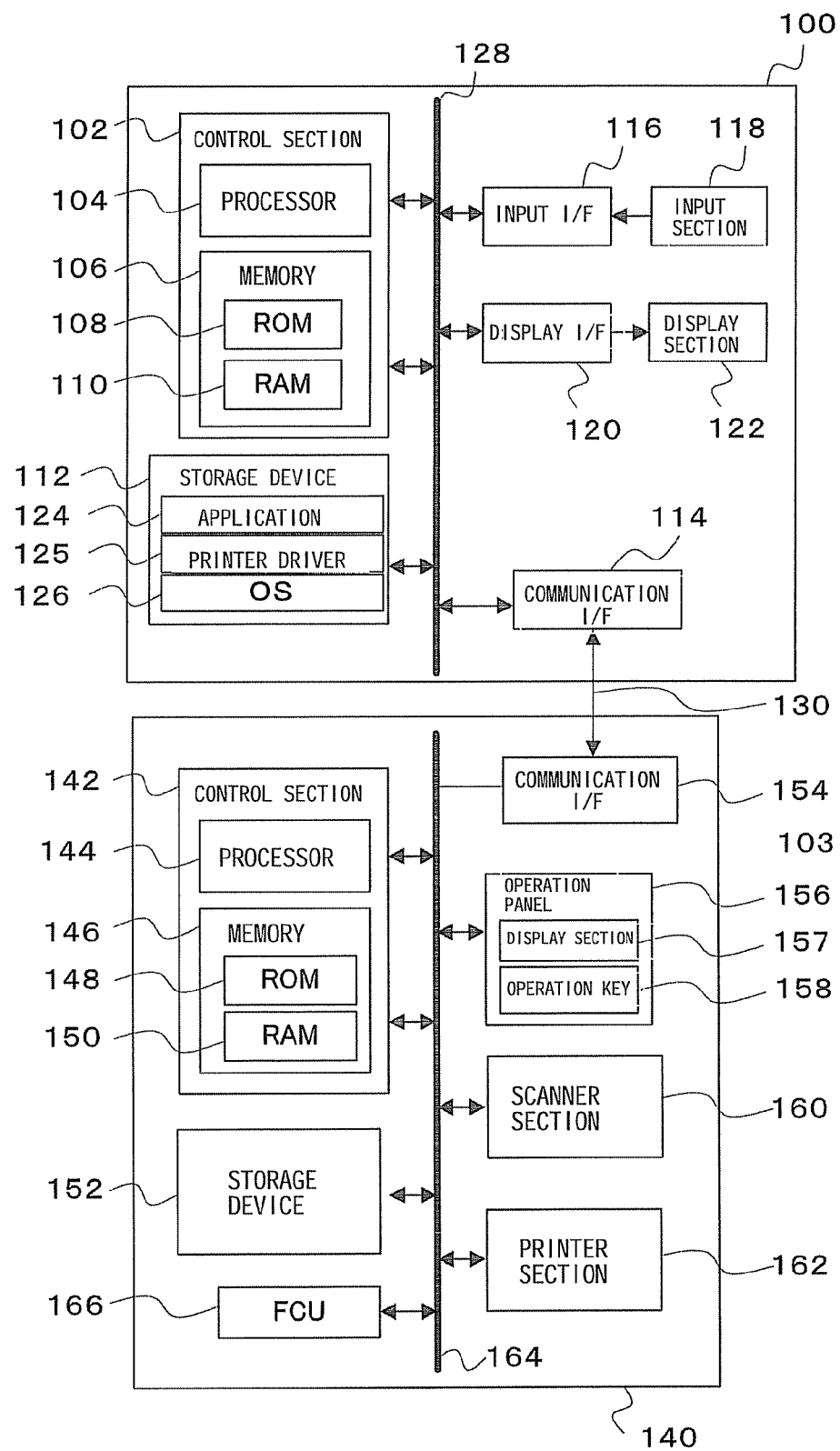
FIG. 1 is a system diagram of a system including an image forming apparatus.

FIG. 1 is a block diagram for explaining the configuration of a system including an image forming apparatus 140. A client terminal 100 and the image forming apparatus 140 are connected via a network 130.

The client terminal 100 includes software and hardware for executing, for example, communication with the image forming apparatus 140 or appropriate combinations of the software and the hardware. The client terminal 100 has an appropriate interface such as a web browser or another dedicated application for transmitting and receiving various web pages, device pages, and the like.

The client terminal 100 includes a control section 102, a storage device 112, a communication interface (communication I/F) 114, an input interface (input I/F) 116, an input section 118, a display interface (display I/F) 120, and a display section 122. As the client terminal 100, a PC (Personal Computer) may be used.

The control section 102 functions according to a processor 104 including a CPU (Central Processing unit) or an MPU (Micro Processing unit), a memory 106, and an operating system (OS) 126. The control section 102 executes processing of a document in which figures, images, characters, tables, and the like are mixed. The memory 106 is, for example, a semiconductor memory. The memory 106 includes a ROM (Read Only Memory) 108 having stored therein a control program for the processor 104 and a RAM (Random Access Memory) 110 that provides the processor 104 with a temporary work area. The components of the client terminal 100 are connected via a bus 128.

The storage device 112 stores an application program 124, a printer driver 125, an OS 126 as a control program for the processor 104. The application program 124 operates as software of the OS 126. The application program 124 includes a web application in addition to general software. The printer driver 125 is a device driver configured to control the image forming apparatus 140 according to a printing instruction from the application program 124. The printer driver 125 operates as software of the OS 126. The storage device 112 may be, for example, a magnetic storage device such as a hard disk drive, an optical storage device, a semiconductor storage device such as a flash memory, or an arbitrary combination of these storage devices.

The communication I/F 114 is an interface connected to an external apparatus. The communication I/F 114 communicates with the image forming apparatus 140 via an appropriate wireless or wired network 130 conforming to IEEE802.15, IEEE802.11, IEEE802.3, IEEE1284, or the like such as Bluetooth (registered trademark), infrared ray connection, or optical connection. The control section 102 communicates with the image forming apparatus 140, a USB device, and other external apparatuses via the communication I/F 114.

The input I/F 116 is connected to the input section 118. As the input section 118, a keyboard device or a mouse as man-machine interface is used.

The display I/F 120 is connected to the display section 122. The display I/F 120 receives data to be displayed on the display section 122 or an instruction from another component connected to the bus 128. The display I/F 120 outputs the display data to the display section 122. As the display section 122, for example, a display attached to a PC is used.

The image forming apparatus 140 includes a control section 142, a storage device 152, a communication interface (communication I/F) 154, an operation panel 156, a scanner section 160 configured to read an original document, and a printer section 162 configured to form an image. The components of the image forming apparatus 140 are connected via a bus 164.

The control section 142 functions according to a processor 144 including a CPU (Central Processing unit) or an MPU (Micro Processing unit), a memory 146, and an operating system (OS). The memory 146 is, for example, a semiconductor memory. The memory 146 includes a ROM (Read Only Memory) 148 having stored therein a control program for the processor 144 and a RAM (Random Access Memory) 150 that provides the processor 144 with a temporary work area. The control section 142 controls the communication I/F 154, the operation panel 156, the scanner section 160, the printer section 162, and a facsimile control unit (FCU) 166 on the basis of a control program and the like stored in the ROM 148 or the storage device 152. The control section 142 further has a function of correcting or expanding image data. The control section 142 may include an ASIC (Application Specific Integrated Circuit) configured to realize a part or all of the functions of the image forming apparatus 140.

The storage device 152 stores application programs and an OS. The application programs include computer programs for executing functions of the image forming apparatus such as a copy function, a print function, a scanner function, a facsimile function, and a network file function. The application programs further include an application for a web client (a web browser) and other applications.

The storage device 152 stores image data of an original document read by the scanner section 160, image data acquired via the communication I/F 154, and the like. The storage device 152 may be, for example, a magnetic storage device such as a hard disk drive, an optical storage device, a semiconductor storage device (a flash memory, etc.), or an arbitrary combination of these storage devices. The storage device 152 appropriately stores software update, a protected electronic document, text data, account information, policy information, and the like.

The communication I/F 154 is an interface connected to an external apparatus. The communication I/F 154 is connected to the external apparatus via the appropriate wireless or wired network 130 conforming to IEEE802.15, IEEE802.11, IEEE802.3, IEEE1284, or the like such as Bluetooth (registered trademark), infrared ray connection, or optical connection. The communication I/F 154 includes a buffer and temporarily stores a part or all of data received via the network 130 in the buffer. The control section 142 communicates with a PC (Personal Computer), a USB device, and other external apparatuses via the communication I/F 154. The control section 142 communicates with the client terminal 100 via the communication I/F 154.

The operation panel 156 includes a display section 157 of a touch panel type and various operation keys 158. The operation keys 158 includes, for example, a ten key, a reset key, a stop key, and a start key. The display section 157 displays, for example, an instruction item concerning a printing condition such as a sheet size, the number of copies, printing density setting, or finishing (stapling and folding). The instruction of the displayed item is input from the display section 157.

The scanner section 160 includes an incorporated scanning and reading unit configured to read an original document as an image, a document placing table, and an auto document feeder configured to convey the original document to a reading position. The scanning and reading unit of the scanner section 160 reads an original document set on the document placing table or the auto document feeder.

The printer section 162 forms, on a sheet, an image corresponding to image data of the original document read by the scanner section 160 or an image corresponding to image data transmitted from the client terminal 100.

The facsimile control unit (FCU) 166 controls transmission processing and reception processing of a facsimile in the image forming apparatus 140.

Figure 2:
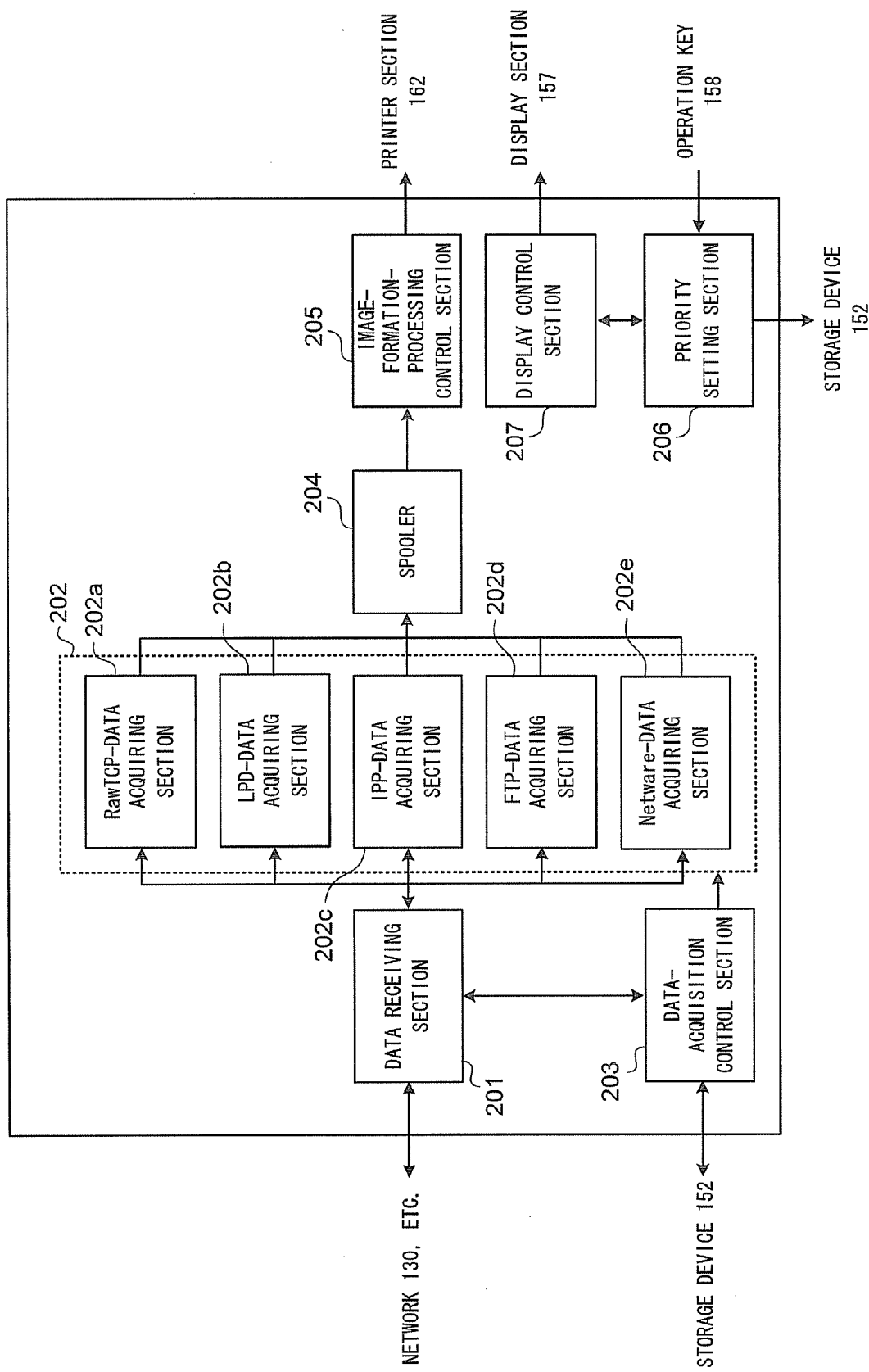
FIG. 2 is a functional block diagram for explaining functions of the image forming apparatus.

FIG. 2 is a functional block diagram of functions of the image forming apparatus 140 according to this embodiment. The image forming apparatus 140 according to this embodiment includes a data receiving section 201, a data acquiring section 202, a data-acquisition control section 203, a spooler 204 as a data output section, an image-formation-processing control section 205, a priority setting section 206, and a display control section 207. The data acquiring section 202 includes data acquiring sections 202a to 202e respectively corresponding to protocols used for communication of received data. In this embodiment, as shown in FIG. 2, as an example, the data acquiring section 202 includes a RawTCP-data acquiring section 202a, an LPD-data acquiring section 202b, an IPP-data acquiring section 202c, an FTP-data acquiring section 202d, and a Netware-data acquiring section 202e. The functional blocks are explained below.

The data receiving section 201 has ports respectively corresponding to plural protocols. The data receiving section 201 receives data such as image formation job data from the client terminal 100 on the network 130 via the port. The data receiving section 201 temporarily stores the data in the buffer of the communication I/F 154 until the data acquiring section 202 corresponding to the protocol corresponding to the port via which the data is received acquires the data. If the size of the received data is smaller than the capacity of the buffer, all the data is stored in the buffer. However, if the size of the received data is larger than the capacity of the buffer, the data acquisition via the ports is put on standby until the data stored in the buffer is acquired by the data acquiring section 202 and a space is formed in the buffer. When the space is formed in the buffer, the data receiving section 201 receives following data.

The data acquiring section 202 acquires the data received by the data receiving section 201 separately for each of types of the protocols used for communication of the data. Specifically, the data acquiring section 202 includes the data acquiring sections (202a to 202e) respectively associated with the protocols used when image formation processing target data is transmitted from the client terminal 100 or the like to the image forming apparatus 140.

As explained above, as an example, the data acquiring section 202 in this embodiment includes the a RawTCP-data acquiring section 202a, the LPD-data acquiring section 202b, the IPP-data acquiring section 202c, the FTP-data acquiring section 202d, and the Netware-data acquiring section 202e.

The Raw-TCP-data acquiring section 202a acquires data transmitted to the image forming apparatus 140 according to a protocol called RawTCP. The LPD-data acquiring section 202b acquires data conforming to an LPD protocol. The IPP-data acquiring section 202c acquires data conforming to an IPP protocol. The FTP-data acquiring section 202d acquires data conforming to an FTP protocol. The Netware-data acquiring section 202e acquires data conforming to a Netware protocol.

The data acquiring sections (202a to 202e) periodically access the data receiving section 201 at a time interval set in advance. When the data receiving section 201 receives data conforming to the protocols respectively associated with the data acquiring sections (202a to 202e), the data acquiring sections (202a to 202e) acquire the data and temporarily store the data in buffers allocated to the data acquiring sections.

When the data acquiring sections (202a to 202e) acquire the data, the data acquiring sections sequentially output the data to the spooler 204. For example, in a state in which the data acquiring sections (202a to 202e) periodically access the data receiving section 201, when the data receiving section 201 receives data conforming to the RawTCP protocol and data conforming to the LPD protocol and, first, the RawTCP-data acquiring section 202a acquires the data conforming to the RawTCP protocol and, then, the LPD-data acquiring section 202b acquires the data conforming to the LPD protocol, the RawTCP-data acquiring section 202a passes the acquired data to the spooler 204. Thereafter, the LPD-data acquiring section 202b passes the acquired data to the spooler 204.

The data acquiring sections (202a to 202e) temporarily store the acquired data in the buffers respectively allocated thereto to hold the data. Therefore, when the size of the data received by the data receiving section 201 is larger than the capacities of the buffers, the data acquiring sections acquire the data separately in several times. In other words, the data acquiring sections acquire data equivalent to the capacities of the allocated buffers every time the data acquiring sections access the data receiving section 201 once. For example, when the size of data A is three times as large as the capacities of the buffers, the data acquiring sections divide the data A into three packets and sequentially acquire the packets in such a manner that the data acquiring sections acquire A-1 in first access, acquire A-2 in second access, and acquire A-3 in third access. Each of the packets includes information indicating which data of the data A the packet is. Therefore, when all packets forming one data are received, for example, in the spooler 204 at an output destination of the data or in RIP processing, the packets are combined and return to one data. Therefore, image formation processing can be correctly performed.

The data-acquisition control section 203 acquires, for each of types of the protocols used for communication of data, priority information concerning priority indicating whether processing for the data takes priority over processing for data transmitted by using the other protocols, for example, from the storage device 152 that stores priority information. The data-acquisition control section 203 controls, on the basis of the priority information acquired by the data receiving section 201, timing when the data acquiring sections (202a to 202e) acquire data such that data received according to a protocol with high priority is preferentially acquired by the data acquiring sections.

Specifically, for example, it is assumed that, when a protocol with highest priority is set as the LPD protocol, the data receiving section 201 receives data conforming to the FTP protocol, then receives data conforming to the IPP protocol, and finally receives data conforming to the LPD protocol and the FTP-data acquiring section 202d already started processing for acquiring data conforming to the FTP protocol. This situation is explained.

In this case, the data-acquisition control section 203 issues, on the basis of the priority information, a standby instruction to the IPP-data acquiring section 202c, which acquires data conforming to the IPP protocol with priority lower than that of the LPD protocol, and controls the IPP-data acquiring section 202c not to perform data acquisition processing. Consequently, the LPD-data acquiring section 202b, which acquires data conforming to the LPD protocol with higher priority than that of the IPP protocol, can more preferentially acquire data than the IPP-data acquiring section 202c. As a result, image formation processing is also performed quickly. When the data receiving section 201 receives data, the data-acquisition control section 203 determines, on the basis of the acquired priority information, whether priority is set for a protocol for the data. If the data-acquisition control section 203 determines that the data conforming to the protocol for which the priority is set is received, the data-acquisition control section 203 issues a standby instruction to the data acquiring sections corresponding to the protocols for which priority is not set (or priority is lower than the priority for the protocol) and controls the data acquiring sections not to perform data acquisition.

On the other hand, in the case of normal processing in which no priority is set, the data acquiring sections acquire data in order of reception of the data by the data receiving section 201 and, after the acquisition, output the data to the spooler 204. Therefore, the data conforming to the LPD protocol is not always subjected to the image formation processing earlier than the data conforming to the IPP protocol.

The spooler 204 temporarily stores the data output by the data acquiring sections (202a to 202e). When the image formation processing is executed by the image-formation-processing control section 205, after the image formation processing ends, the spooler 204 outputs the data stored therein to the image-formation-processing control section 205.

Usually, the spooler 204 acquires divided data (packets) from the data acquiring sections 202a to 202e in order. There are two kinds as a system for the spooler 204 to output the data one by one. One is a completion system for outputting the data in order from data, all packets of which are received, to the image-formation-processing control section 205 and performing the image formation processing. The other is a sequential system for sequentially outputting, every time a packet of data, a first packet of which is output to the spooler 204, is output to the spooler 204 from the data, the output packet to the image-formation-processing control section 205 and performing the image formation processing. The image forming apparatus 140 according to this embodiment can efficiently perform processing for data with high priority irrespective of which of the systems is adopted.

The image-formation-processing control section 205 controls the printer section 162 on the basis of the data output from the spooler 204 to execute the image formation processing. The image-formation-processing control section 205 includes, besides a control section configured to control the printer section 162, a function of an RIP configured to execute processing for converting PDL data or the like into a raster image. An image-formation processing section includes the image-formation-processing control section 205 and the printer section 162.

The priority setting section 206 performs processing for setting priority. Specifically, when the priority setting section 206 receives, from the operation keys 158 of the operation panel 156, an instruction for displaying a priority setting screen in order to perform setting of priority, the priority setting section 206 issues an instruction to the display control section 207 to instruct the display control section 207 not to display the priority setting screen. When priority is set by an operation input of the operation keys 158 to the displayed priority setting screen, the priority setting section 206 executes processing for causing the storage device 152 to store setting information of the priority.

Figure 3:
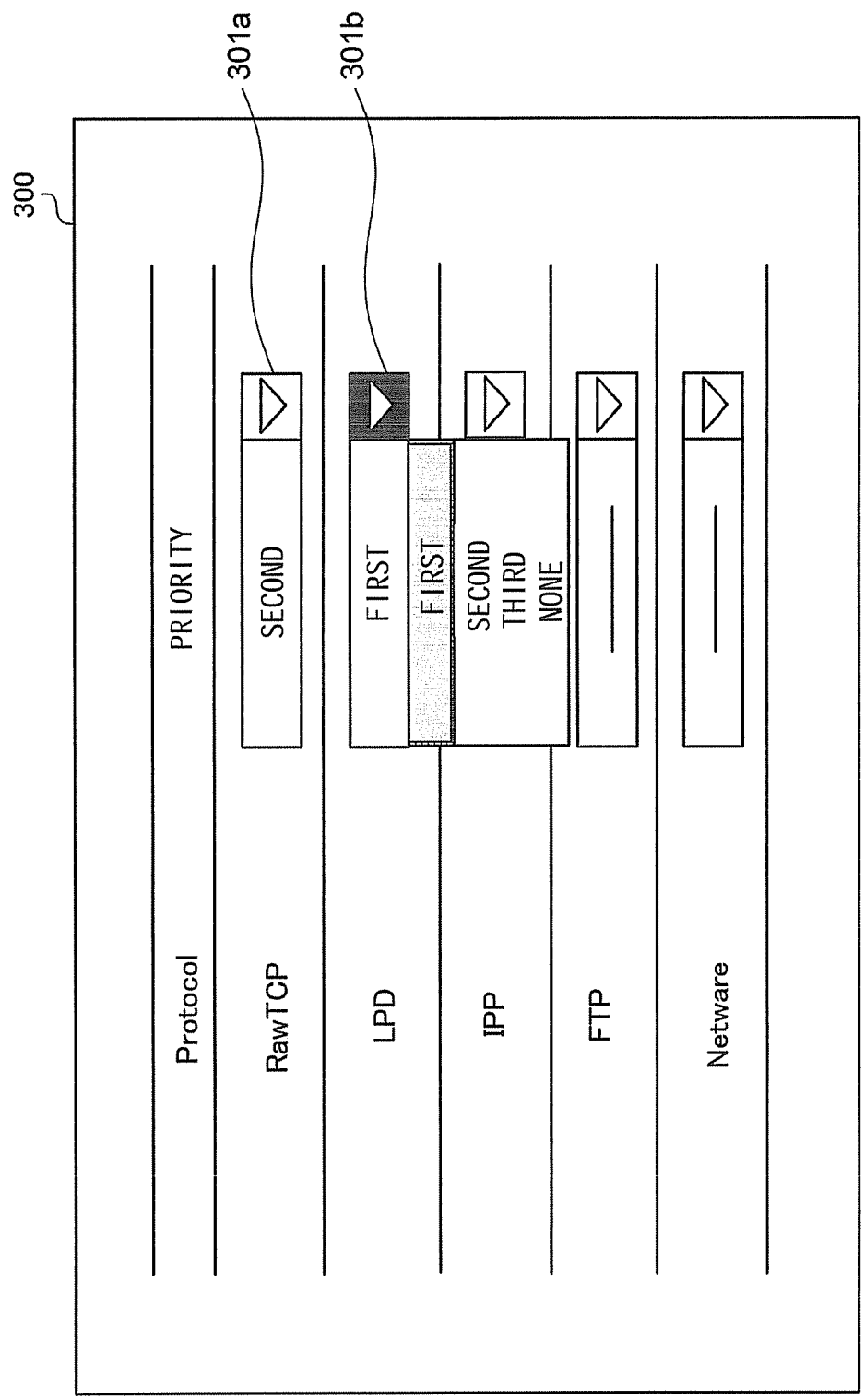
FIG. 3 is a diagram of an example of a priority setting screen.

The display control section 207 performs processing for causing the display section 157 to display the priority setting screen. FIG. 3 is a diagram of an example of a priority setting screen 300. On the priority setting screen 300, priorities for data processing employing the communication protocols can be selected and set by using pull-down menus. On a screen shown in FIG. 3, second priority is selected in a pull-down menu 301*a* for setting priority for processing for data received according to the RawTCP protocol and first priority is selected in a pull-down menu 301*b* for the LPD protocol.

When the priorities are set with the setting content, the priority setting section 206 causes the storage device 152 to store priority information designating the priorities, for example, in a format such as a data table shown in FIG. 4. FIG. 4 is a data table of an example of the priority information. In the data table, second priority is set for RawTCP and first priority is set for LPD to correspond to the priority information in the pull-down menus shown in FIG. 3. Priorities are not set for data of the other protocols.

Figure 5:
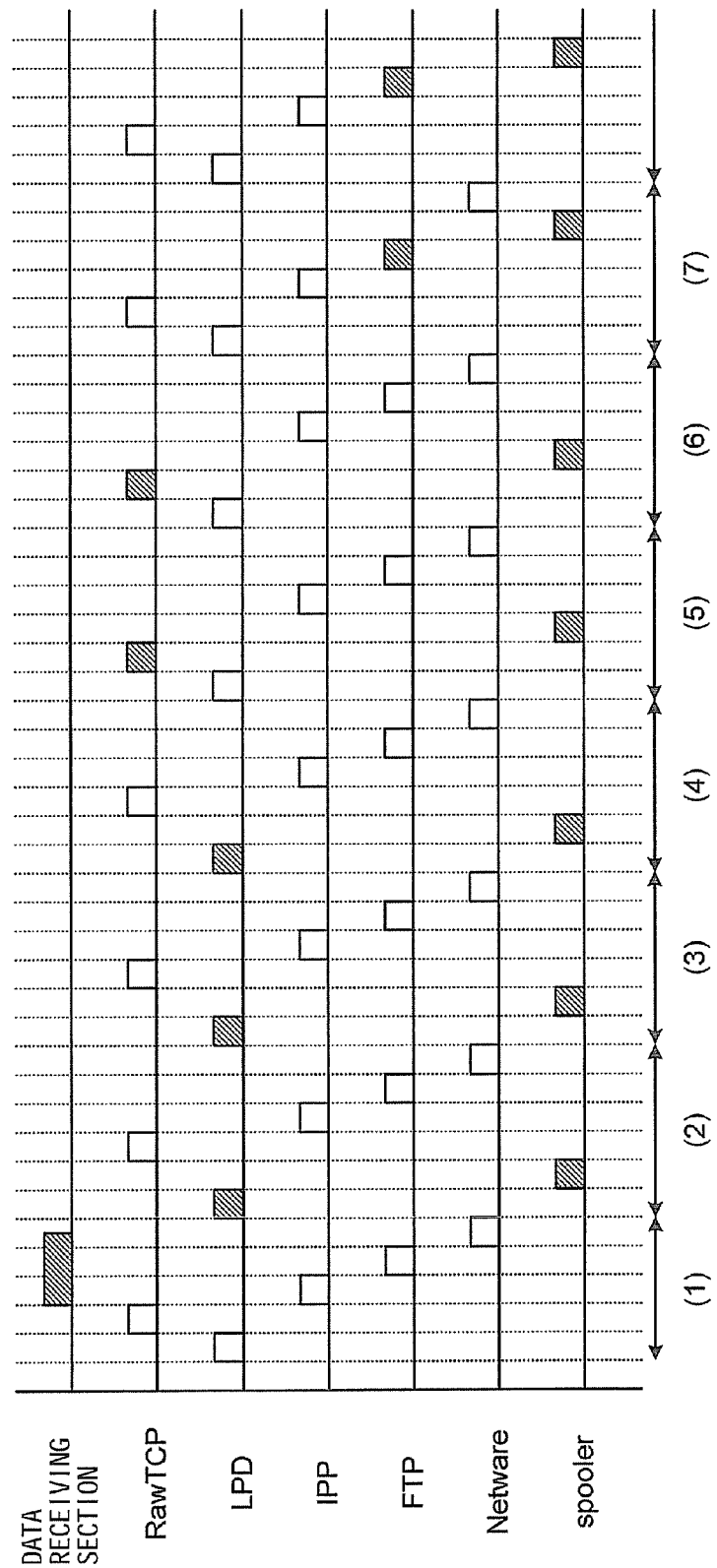
FIG. 5 is a timing chart for explaining timings of acquisition of data by data receiving sections and output processing to a spooler.

Processing actually executed by the functional blocks is explained with reference to a timing chart. FIG. 5 is a timing chart for explaining timings of reception of data by the data receiving section 201, acquisition of data by the RawTCP-data acquiring section 202*a*, the LDP-data acquiring section 202*b*, the IPP-data acquiring section 202*c*, the FTP-data acquiring section 202*d*, and the Netware-data acquiring section 202*e* as the data acquiring sections, and output processing for data from the data acquiring sections to the spooler 204.

The abscissa of FIG. 5 indicates elapse of time. In FIG. 5, rectangles shown on lines of the data receiving section 201, the data acquiring sections 202*a* to 202*e*, and the spooler 204 indicate that data receiving section 201, the data acquiring sections, and the spooler 204 perform processing at timings in the positions of the rectangles. When the processing is processing accessing the data receiving section 201 and actually acquiring data of the protocols corresponding to the data acquiring sections by the data-acquiring sections, the rectangles are hatched. When no data is present and acquired, the rectangles are shown as white void rectangles. For the data receiving section 201 and the spooler 204, in the same manner, when data is actually acquired, the rectangles are hatched.

Usually, the data acquiring sections 202*a* to 202*e* can acquire data only by capacities of the buffers allocated thereto in one access to the data receiving section 201. Therefore, when the volume of one data cannot be acquired by performing access processing once, the data acquiring sections divide the one data into several packets and acquires the data. In the following explanation, the data acquiring sections acquire the one data by accessing the data receiving section 201 plural times.

In the explanation of the processing illustrated in FIG. 5, priority for data conforming to the LPD protocol is set as first priority and priority for data conforming to the RawTCP protocol is set as second priority.

In FIG. 5, the data acquiring sections are set to perform processing for accessing the data receiving section 201 at a predetermined cycle in such order as the LPD-data acquiring section 202*b*, the RawTCP-data acquiring section 202*a*, the IPP-data acquiring section 202*c*, the FTP-data acquiring section 202*d*, and the Netware-data acquiring section 202*e* and checking whether there is reception data of the protocols respectively corresponding to the data acquiring sections.

In FIG. 5, at a first cycle indicated by a double-pointed arrow (1), access processing is performed in such order as the LPD-data acquiring section 202*b*, the RawTCP-data acquiring section 202*a*, the IPP-data acquiring section 202*c*, the FTP-data acquiring section 202*d*, and the Netware-data acquiring section 202*e*. However, no data is present and acquisition of data is not performed.

Halfway in the first cycle, at timing before access processing at a second cycle by the LPD-data acquiring section 202*b* and the RawTCP-data acquiring section 202*a* is started, the data receiving section 201 receives data via the port. The data is data conforming to the LPD protocol and data conforming to the RawTCP.

In this case, the LPD-data acquiring section 202*b* that acquires the data conforming to the LPD protocol with the first priority starts the acquisition of the data at the second cycle. In FIG. 5, a rectangle of the LPD-data acquiring section 202*b* at the second cycle is hatched to indicate the acquisition of the data.

When the LPD-data acquiring section 202*b* acquires data for one packet that can be acquired in one acquisition processing, data for one packet is output from the LPD-data acquiring section 202*b* to the spooler 204 at the next timing of the acquisition processing. In FIG. 5, acquisition of data by the spooler 204 at the next timing of the acquisition of the data by the LPD-data acquiring section 202*b* is indicated by a hatched rectangle on the line of the spooler 204.

On the other hand, concerning the next RawTCP-data acquiring section 202*a*, the data receiving section 201 receives data conforming to the RawTCP protocol corresponding thereto. However, priority for the data conforming to the RawTCP protocol is second priority. Therefore, the RawTCP-data acquiring section 202*a* accesses the data receiving section 201 but does not perform acquisition of data until the LPD-data acquiring section 202*b* finishes acquiring all the packets for the one data.

The data-acquisition control section 203 controls the processing for preferentially performing acquisition processing for data conforming to a protocol with high priority and putting acquisition of information by a protocol with low priority (or a priority for which priority is not set) on standby in this way. Specifically, in the example shown in FIG. 5, the data-acquisition control section 203 issues a standby instruction to the RawTCP-data acquiring section 202*a* to instruct the RawTCP-data acquiring section 202*a* not to perform, until the LPD-data acquiring section 202*b* completes acquisition of data, acquisition processing for data when the RawTCP-data acquiring section 202*a* accesses the data receiving section 201. The RawTCP-data acquiring section 202*a* stays on standby on the basis of the standby instruction without acquiring data conforming to the RawTCP protocol received in the data receiving section 201.

In FIG. 5, in a second cycle, the LPD-data acquiring section 202*b* starts acquisition of data. In a fourth cycle, acquisition of all the packets forming the one data received by the LPD protocol is completed. When the LPD-data acquiring section 202*b* completes the acquisition processing for data, the data-acquisition control section 203 issues an instruction to the RawTCP-data acquiring section 202*a* to instruct the RawTCP-data acquiring section 202*a* to start data acquisition processing. The RawTCP-data acquiring section 202*a* starts acquisition of data at a fifth cycle in FIG. 5.

As explained above, with the image forming apparatus 140 having the configuration according to this embodiment, it is possible to more preferentially execute acquisition processing for information employing a protocol with high priority than processing for information with low priority or for which priority is not set. Therefore, it is possible to perform efficient image formation processing suitable for an environment and a situation in which the image forming apparatus 140 is used.

In the image forming apparatus 140, when priorities are not set, if data conforming to the protocols corresponding to the data acquiring sections 202a to 202e is present when the data acquiring sections 202a to 202e access the data receiving section 201, the data acquiring sections 202a to 202e respectively acquire data and output the data to the spooler 204 at the next timing. If the spooler 204 adopts the completion system, the spooler 204 outputs the data to the image-formation-processing control section 205 in order from the data collected as one data. If the spooler 204 adopts the sequential system, concerning data acquired as first data (packet) of divided data, the spooler 204 outputs, every time a divided packet is received, the packet to the image-formation-processing control section 205 and performs the image formation processing.

Figure 6:
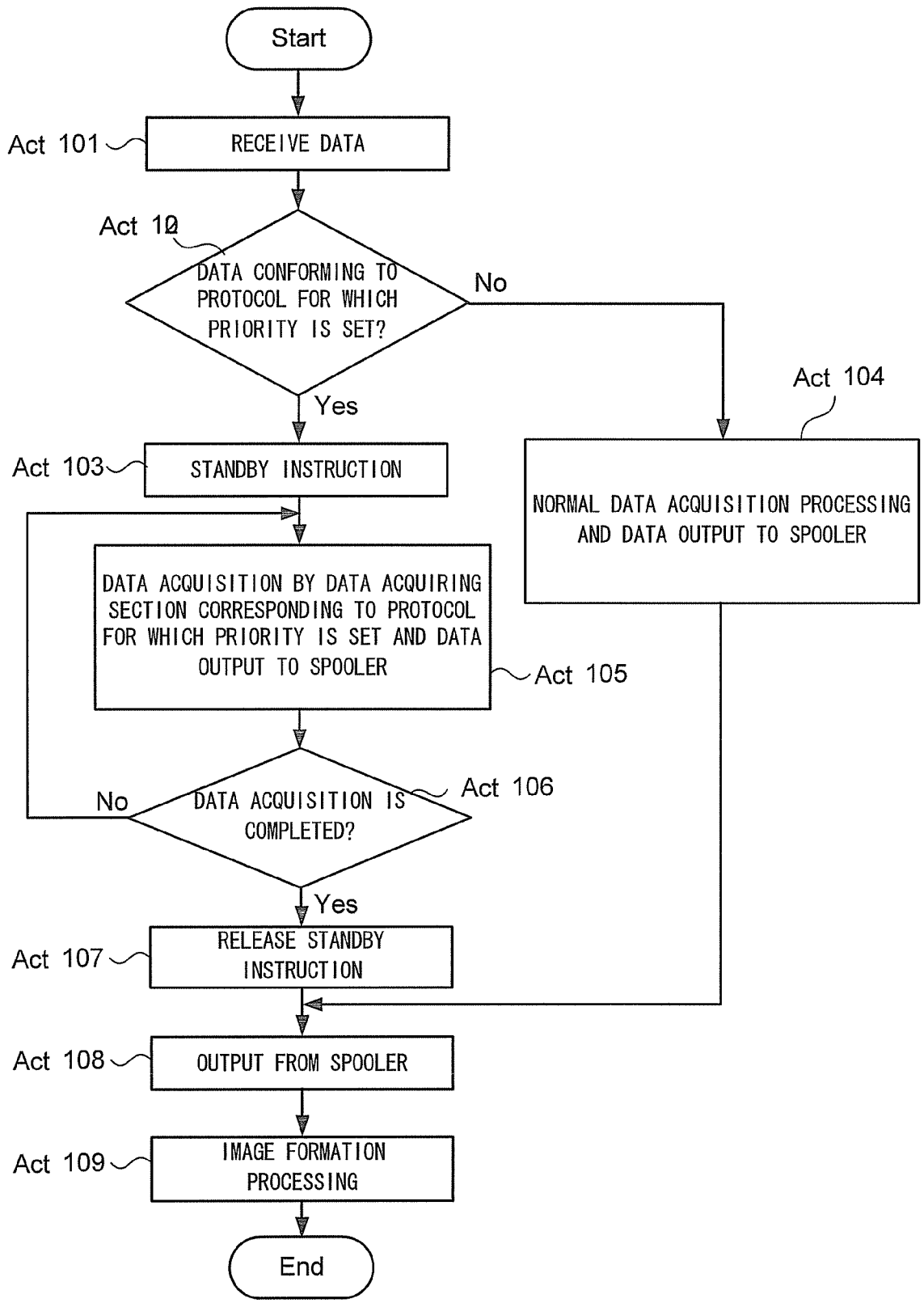
FIG. 6 is a flowchart for explaining a flow of processing by the image forming apparatus.

A flow of processing by the image forming apparatus 140 according to this embodiment is explained. FIG. 6 is a flowchart for explaining a flow of processing by the image forming apparatus 140. In the flow explained below, it is assumed that the spooler 204 performs data processing according to the sequential system.

In Act 101, when an image forming job is transmitted from the client terminal 100 or the like, the data receiving section 201 receives data and the buffer of the communication I/F 154 included in the data receiving section 201 stores the data.

In Act 102, the data-acquisition control section 203 determines whether the data received by the data receiving section 201 is data conforming to a protocol for which priority is set.

If the data-acquisition processing section 203 determines that the data is the data conforming to the protocol for which the priority is set (Yes in Act 102), in Act 103, the data-acquisition control section 203 issues an instruction to the data acquiring sections corresponding to protocols with priorities lower than that of the protocol for which the priority is set to instruct the data acquiring sections to stay on standby not to acquire data. When any one of the data acquiring sections 202a to 202e receives the standby instruction, even if the data receiving section 201 receives data conforming to the protocols corresponding to the data acquiring sections that receive the standby instruction, the data acquiring sections that receive the standby instruction do not perform acquisition of data until the standby instruction is released.

If the data is not the data conforming to the protocol for which the priority is set (No in Act 101), the processing proceeds to Act 104.

In Act 105, the data acquiring section corresponding to the protocol for which the priority is set acquires data of the corresponding protocol among the data stored in the buffer of the data receiving section 201 and sequentially outputs the data to the spooler 204.

In Act 106, the data-acquisition control section 203 determines whether the data acquisition processing by the data acquiring section corresponding to the protocol for which the priority is set is completed.

If the data acquisition is completed (Yes in Act 106), in Act 107, the data-acquisition control section 203 releases the standby instruction for the data acquiring sections corresponding to the protocols for which priorities are not set. When the standby instruction is released in Act 107, the data acquiring sections 202a to 202e resume the normal data acquisition processing at timing of accessing the data receiving section 201 set in advance. When the corresponding data is present in the data receiving section 201, the data acquiring sections 202a to 202e acquire the data and output the data to the spooler 204.

On the other hand, if the data acquisition is not completed (No in Act 106), the processing returns to Act 105 and the determination processing is repeated.

In Act 108, in order to perform the image formation processing in order from data, a first packet of which is received, among packets as divided data on the basis of the sequential system, the spooler 204 sequentially outputs the packet of the data, the first packet of which is acquired, to the image-formation-processing control section 205 every time the packet is acquired.

In Act 109, the image-formation-processing control section 205 executes the image formation processing according to the acquired data. The image formation processing is RIP processing or actual image formation processing according to a raster image generated by the RIP processing.

On the other hand, if the data-acquisition control section 203 determines that the data is not the data for which the priority is set (No in Act 102), in Act 104, the data acquiring sections 202a to 202e performs the normal data acquisition processing. Specifically, the data-acquisition control section 203 does not issue a special instruction to the data acquiring sections 202a to 202e and the data acquiring sections 202a to 202e access the data receiving section 201 at timing set in advance. When data conforming to the protocols corresponding to the data acquiring sections 202a to 202e is received by the data receiving section 201, the data acquiring sections 202a to 202e acquire the data and sequentially output the acquired data to the spooler 204. Processing in Act 108 and Act 109 is the same as the processing explained above.

The processing for outputting data by the spooler 204 in Act 108 and the image formation processing in Act 109 do not always have to be performed after the data acquisition processing. The data acquiring sections 202a to 202e sequentially output data acquired by accessing the data receiving section 201 once to the spooler 204. When the spooler 204 adopts the sequential system, concerning the data, the first packet of which is acquired, the spooler 204 outputs, every time a packet is acquired, the packet to the image-formation-processing control section 205. The image-formation-processing control section 205 executes the image formation processing in order of the acquisition of the data. Therefore, the processing in Act 108 and Act 109 may be executed in parallel to the data acquisition processing and the like.

When two or more priorities are set and data conforming to protocols for which the priorities are set is received, for example, when acquisition of the data conforming to the protocol with the first priority is completed, a standby instruction to the data acquiring section corresponding to the protocol with the second priority is released and the data acquiring section corresponding to the second priority acquires the data. A standby state only has to be released in order to acquire data in such a manner that, when acquisition of the data conforming to the protocol with the second priority is completed, a standby instruction to the data acquiring section corresponding to the third protocol is released and the data acquiring section corresponding to the third priority acquires the data.

The flow of the image formation processing by the image forming apparatus 140 is as explained above. The kinds of processing indicated by the flowchart are realized by causing the processor 104 to execute a computer program stored in the memory 106. Apart or all of the kinds of processing may be realized by an ASIC.

The protocols that can be acquired by the image forming apparatus 140 according to this embodiment are examples and may be any protocols. The image forming apparatus 140 can execute the data acquisition processing explained in the embodiment in the same manner by including data acquiring sections corresponding to the protocols.

In the embodiment, even the data acquiring section corresponding to the protocol for which priority is not set accesses the data receiving section 201. However, the present invention is not limited to this. For example, it is also possible that, when the data acquiring section corresponding to the protocol for which priority is set is acquiring data, the data acquiring section corresponding to the protocol for which priority is not set does not access the data receiving section 201. This makes it possible to more efficiently acquire data according to protocols for which priorities are set.

Second Embodiment

An image forming apparatus 140A according to this embodiment is different from the image forming apparatus 140 according to the first embodiment in that an amount of data acquired from the data receiving section 201 once by the data acquiring sections (202a to 202e) corresponding to a protocol with high priority is larger. This embodiment is explained below. However, components same as those in the first embodiment are denoted by the same reference numerals and signs and explanation of the components is omitted.

Figure 7:
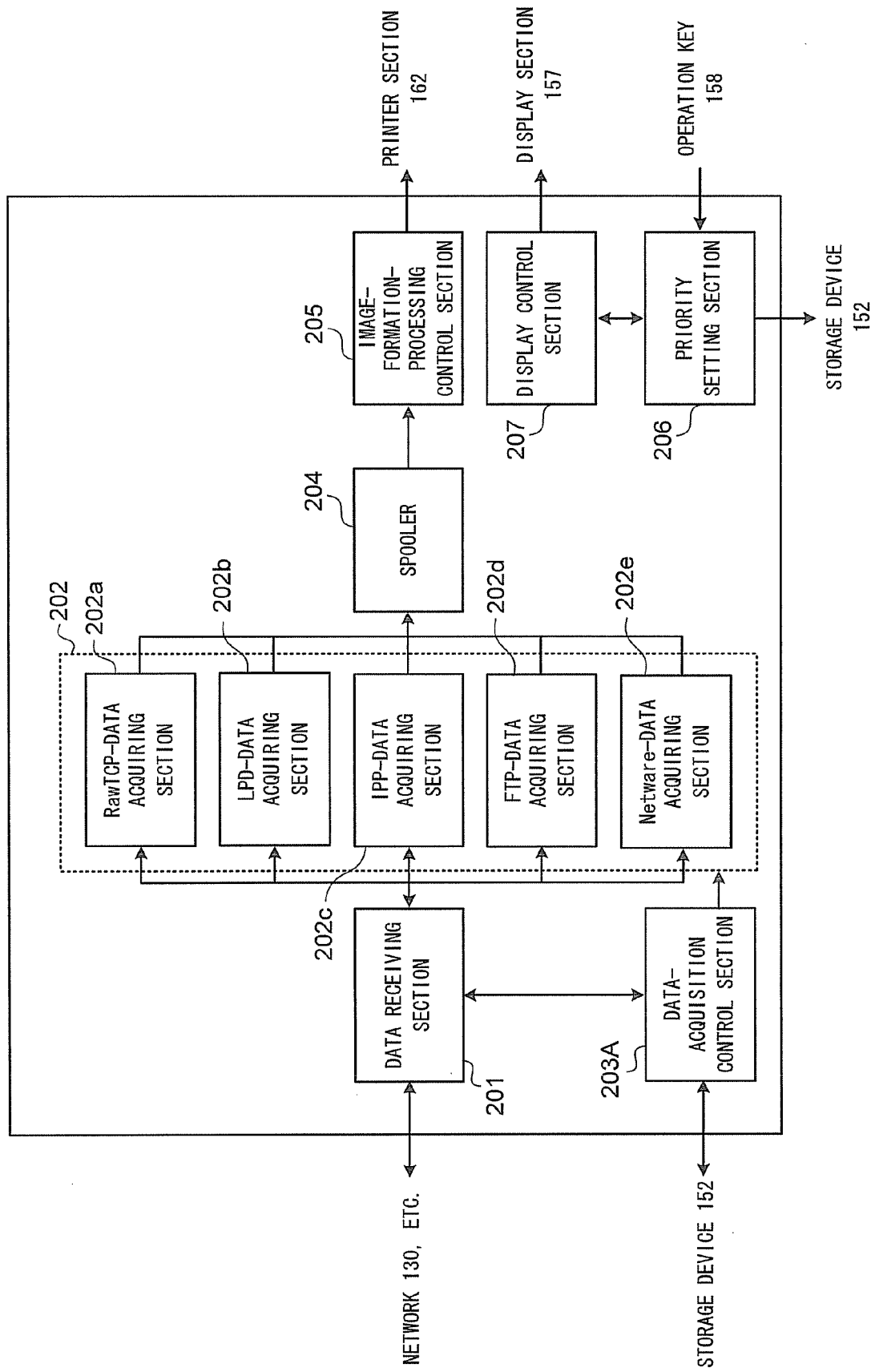
FIG. 7 is a functional block diagram of functions of an image forming apparatus.

FIG. 7 is a functional block diagram of functions of the image forming apparatus 140A. The image forming apparatus 140A includes the data receiving section 201, the data acquiring section 202, a data-acquisition control section 203A, the spooler 204, the image-formation-processing control section 205, the priority setting section 206, and the display control section 207. Since the data receiving section 201, the data acquiring section 202, the spooler 204, the image-formation-processing control section 205, the priority setting section 206, and the display control section 207 have functions same as those in the first embodiment, explanation of the sections is omitted.

The data-acquisition control section 203A performs processing for acquiring priority set for any one of the protocols stored in the storage device 152 and setting, on the basis of the priority, an amount of data that the data acquiring sections (202a to 202e) can acquire from the data receiving section 201 by performing data acquisition processing once. Specifically, for example, when the priority for the LPD protocol is set as the first priority and the priority for the RawTCP protocol is set as the second priority, amounts of acquisition of data per one access to the data receiving section 201 are set for the LPD-data acquiring section 202b, the RawTCP-data acquiring section 202a, and the remaining other data acquiring sections (in FIGS. 7, 202c to 202e) in order from a largest amount.

As explained in the first embodiment, the amounts of acquisition of data depend on the capacities of the buffers allocated to the data acquiring sections 202a to 202e. The data-acquisition control section 203A changes the capacities of the buffers of the data acquiring sections 202a to 202e and increases or reduces the amounts of acquisition of data. If the capacities of the buffers allocated to the data acquiring sections 202a to 202e increase, the amounts of acquisition of data per one access increases. Data received by the data receiving section 201 can be acquired in a smaller number of accesses. As a result, processing up to the image formation processing for data received according to the protocols with high priorities is more quickly performed.

Figure 8:
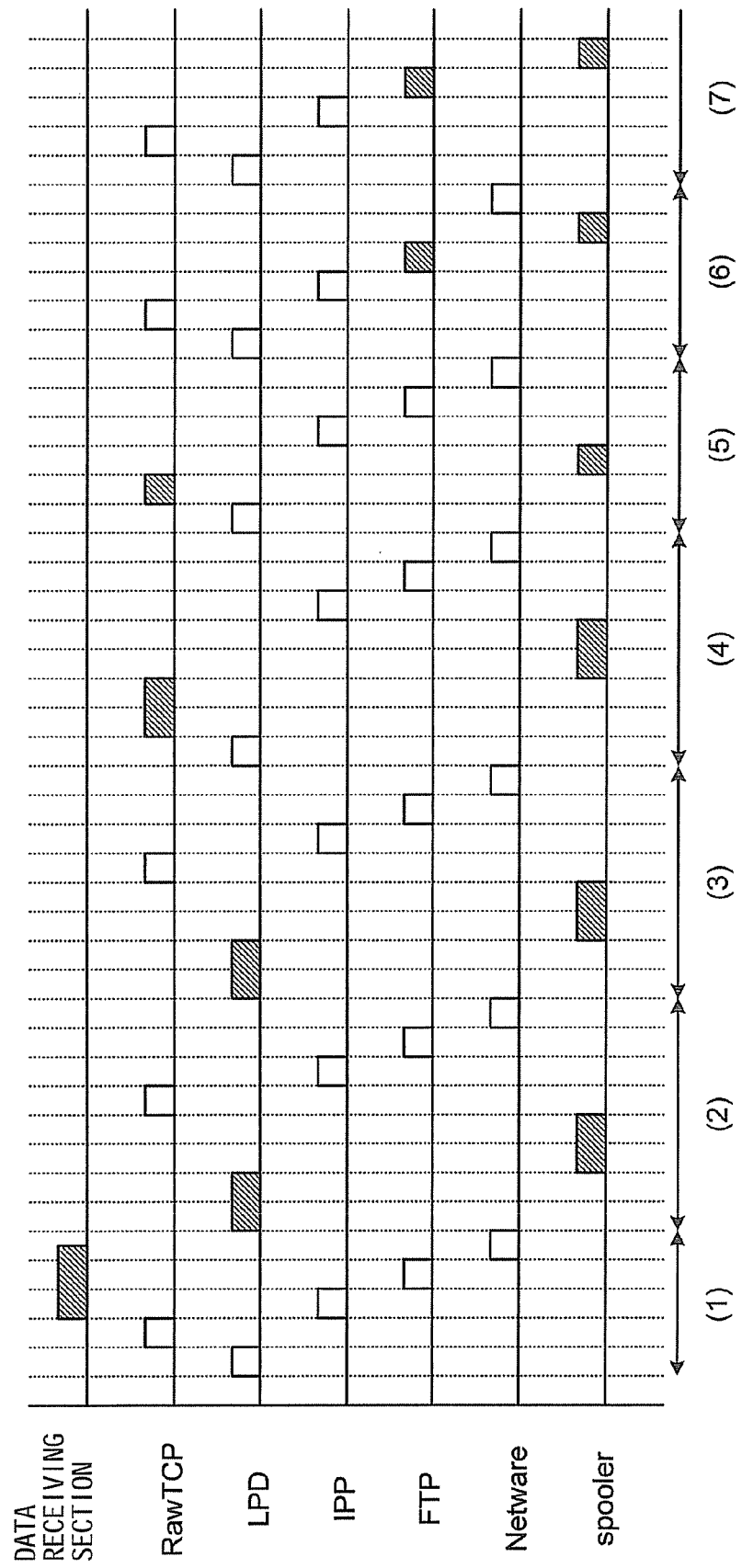
FIG. 8 is a timing chart for explaining timings of acquisition of data by data acquiring sections of the image forming apparatus and output processing to a spooler.

When an amount of data acquired by any one of the data acquiring sections 202a to 202e in accessing the data receiving section 201 once is changed to be increased, if data acquisition speed is the same, time for performing the data acquisition processing once is extended because of the increase in the amount of data. FIG. 8 is a timing chart for explaining timings of processing for accessing the data receiving section 201 and acquisition of data by the data acquiring sections 202a to 202e of the image forming apparatus 140A and output processing to the spooler 204.

As shown in FIG. 8, time for acquisition of data by the LDP-data acquiring section 202b for which priority is set high and an amount of acquisition of data is set large and time for outputting the data to the spooler 204 are longer than the times in causing the LPD-data acquiring section 202b to simply acquire data preferentially as shown in FIG. 5. Since the amount of acquisition of data per one data access is larger, the LPD-data acquiring section 202b completes the acquisition of data by accessing the data receiving section 201 twice and shifts to acquisition of data according to the RawTCP protocol in the fourth cycle.

With the image forming apparatus 140A explained above, in addition to preferentially performing the processing for acquiring data corresponding to the protocols with high priorities, since an amount of data acquired by accessing the data receiving section 201 once increases, it is possible to more preferentially process received data conforming to the protocols with high priorities and more efficiently perform the image formation processing.

Figure 9:
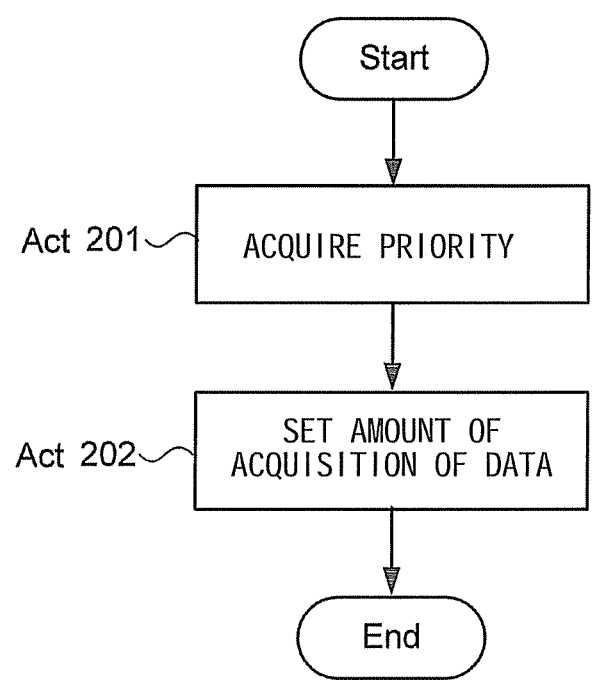
FIG. 9 is a flowchart for explaining a flow of processing for controlling amounts of acquisition of data acquired when the data acquiring sections access a data receiving section once according to priority in the image forming apparatus.

A flow of processing by the image forming apparatus 140A is explained below. FIG. 9 is a flowchart for explaining a flow of processing by the image forming apparatus 140A for controlling amounts of acquisition of data acquired when the data acquiring sections 202a to 202e access a data receiving section 201 once according to priorities. After amounts of acquisition of data are set according to priorities, processing by the data acquiring sections 202a to 202e of the image forming apparatus 140A for receiving data from the data receiving section 201 and outputting the data to the spooler 204 is the same as that in the first embodiment. Explanation of the processing is omitted.

In Act 201, the data-acquisition control section 203A acquires priorities of data processing associated with protocols set in advance stored in the storage device 152. As an example of the priorities, in the following explanation, priority for the LPD protocol is first priority and priority for the RawTCP protocol is second priority. The remaining protocols are protocols with priorities lower than the second priority of the RawTCP protocol. Among the remaining protocols, the priorities are treated as the same.

Subsequently, the data-acquisition control section 203A sets the capacities of the buffers of the data acquiring sections such that the capacities of the buffers of the data acquiring sections corresponding to the protocols with high priorities are larger (Act 202). In the example explained above, the data-acquisition control section 203A sets the capacity of the buffer allocated to the LPD-data acquiring section 202b corresponding to the first priority to be the largest. The data-acquisition control section 203A sets the capacity of the buffer of the RawTCP-data acquiring section 202a corresponding to the second priority to the second largest capacity and sets the capacities of the buffers of the remaining data acquiring sections to capacities smaller than that of the buffer of the RawTCP-data acquiring section 202a.

The flow of the processing for setting amounts of acquisition of data is explained above. The kinds of processing in the flowchart are realized by causing the processor 144 to execute a computer program stored in the memory 146. A part or all of the kinds of processing may be realized by an ASIC.

Third Embodiment

An image forming apparatus 140B according to a third embodiment automatically sets priority on the basis of reference data as a reference for setting priority. The image forming apparatus 140B according to this embodiment is different from the image forming apparatus 140 according to the first embodiment in that, whereas a user manually sets priority on the setting screen in the image forming apparatus 140, the image forming apparatus 140B automatically sets priority on the basis of the reference data. This embodiment is explained below. However, components same as those in the first embodiment are denoted by the same reference numerals and signs and explanation of the components is omitted.

In the following explanation, it is assumed that a reception frequency of data for each of protocols is used as the reference data as the reference for setting priority.

Figure 10:
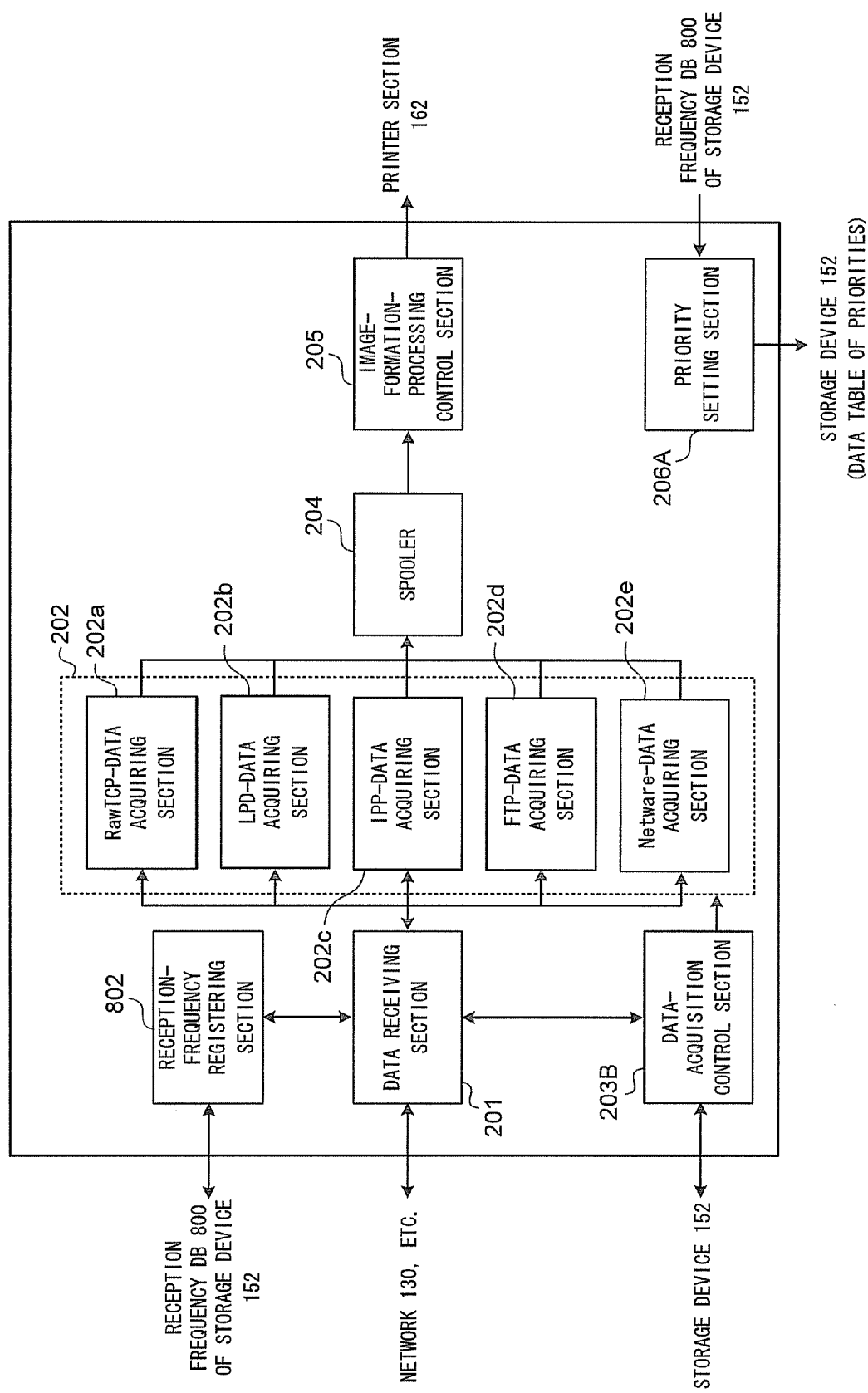
FIG. 10 is a functional block diagram for explaining functions of an image forming apparatus.

FIG. 10 is a functional block diagram for explaining functions of the image forming apparatus 140B. The image forming apparatus 140B includes the data receiving section 201, the data acquiring section 202, a data-acquisition control section 203B, the spooler 204, the image-formation-processing control section 205, a priority setting section 206A, and a reception-frequency registering section 802 as a reception-frequency calculating section. Since the data receiving section 201, the data acquiring section 202, the spooler 204, and the image-formation-processing control section 205 have functions same as those in the first embodiment, explanation of the sections is omitted.

The priority setting section 206A acquires reception frequency information from a reception frequency database (DB) 800 stored in the storage device 152. The reception frequency information recorded in the reception frequency DB 800 is data concerning a reception frequency of data for each of protocols. Priorities for protocols with high reception frequencies are set high on the basis of the reception frequency information. As explained in the first embodiment, the priority setting section 206A performs the setting of priorities by registering priorities in the data table of priorities (FIG. 4) stored in the storage device 152.

For example, when the priority setting section 206A acquires the reception frequency information indicating that a reception frequency of data reception according to the LPD protocol is the highest and a reception frequency of data reception by the RawTCP protocol is the second highest, the priority setting section 206A sets priority for the LPD protocol as first priority and sets priority for the RawTCP protocol as second priority. The remaining protocols for which priority is not set are protocols with priorities lower than that for the RawTCP protocol. Among the remaining protocols, the priorities are treated as the same.

The data-acquisition control section 203B acquires the priorities set by the priority setting section 206A on the basis of the reception frequency information from the storage device 152 and controls the data acquiring sections (202a to 202e) corresponding to the protocols with high priorities to preferentially acquire data. Processing for causing the data acquiring sections corresponding to the protocols with high priorities to more preferentially acquire data than the data acquiring sections corresponding to protocols with low priorities is the processing method explained in the first embodiment. As explained in the second embodiment, the data-acquisition control section 203B may set the capacities of the buffers larger for the data acquiring sections corresponding to the protocols with high priorities and increase amounts of acquisition of data to thereby increase data acquisition speed.

The reception-frequency registering section 802 calculates reception frequencies by protocols of data received by the data receiving section 201. The reception-frequency registering section 802 registers the calculated reception frequencies in the reception frequency DB 800 stored in the storage device 152. Since the reception frequencies fluctuate, the reception-frequency registering sections 802 may periodically update the reception frequencies in the reception frequency DB 800.

Figure 11:
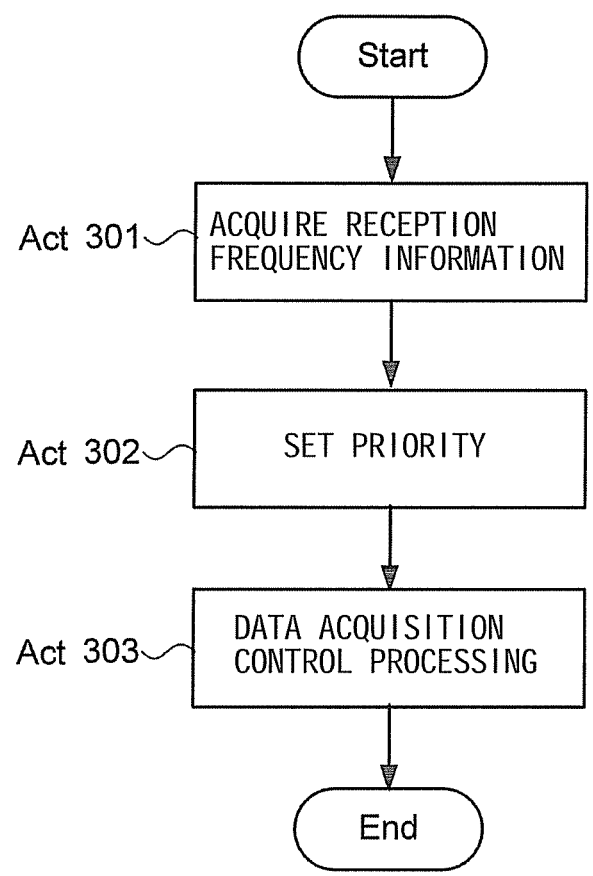
FIG. 11 is a flowchart for explaining priority setting processing based on reception frequency information in the image forming apparatus.

A flow of processing by the image forming apparatus 140B is explained below. FIG. 11 is a flowchart for explaining a flow of priority setting processing based on the reception frequency information. Processing by the data acquiring sections 202a to 202e of the image forming apparatus 140B for receiving data from the data receiving section 201 and outputting the data to the spooler 204 is the same as that in the first embodiment. Therefore, explanation of the processing is omitted.

In Act 301, the priority setting section 206A accesses the reception frequency DB 800 in which the reception frequencies are registered by the reception-frequency registering section 802 and acquires the reception frequency information.

In Act 302, the priority setting section 206A sets priority for at least one protocol on the basis of the acquired reception frequency information.

In Act 303, the data-acquisition control section 203B acquires the priority set by the priority setting section 206A from the storage device 152 and controls, on the basis of the acquired priority, the data acquiring sections 202a to 202e such that the data acquiring sections corresponding to the protocols with high priorities more preferentially acquire data. The acquisition control processing is processing explained in the first embodiment.

The method of setting priority according to this embodiment and a flow of the data acquisition control processing based on the priority are explained above. The kinds of processing in the flowchart are realized by causing the processor 144 to execute a computer program stored in the memory 146. A part or all of the kinds of processing may be realized by an ASIC.

The processing by the priority setting section 206A for accessing the reception frequency DB 800 and acquiring the reception frequency information in Act 301 can be performed at timing set in advance such as the start of the image forming apparatus 140B. After the start of the image forming apparatus 140B, for example, when the reception frequency is updated by the reception-frequency registering section 802, the priority setting section 206A may acquire the reception frequency information and set priorities again.

The priorities may be set on the basis of not only the reception frequencies explained in this embodiment but also information such as the number of times of reception of data for each of the protocols.

The computer program for causing the computer included in the image forming apparatus to execute the operations explained above can be provided as a data processing control program. In the explanation of this embodiment, the computer program for realizing the functions for carrying out the invention is recorded in advance in the storage area such as the memory or the HDD provided in the apparatus. However, the present invention is not limited to this. The same computer program may be downloaded from a network to the apparatus. The same computer program stored in a computer-readable recording medium may be installed in the apparatus. A form of the recording medium may be any form as long as the recording medium can store the computer program and can be read by the computer. Specifically, examples of the recording medium include internal storage devices internally mounted on the computer such as a ROM and a RAM, portable storage media such as a CD-ROM, a flexible disk, a DVD disk, a magneto-optical disk, and an IC card, a database that stores a computer program, other computers and databases for the computers, and a transmission medium on a line. The functions obtained by the installation or the download in advance in this way may be realized in cooperation with an OS (operating system) in the apparatus.

The computer program may be an execution module that is dynamically generated partially or entirely.

As explained above in detail, with the technique described in this specification, it is possible to provide an apparatus that receives data according to plural kinds of protocols, the apparatus being configured to more efficiently process data conforming to the protocols with high priorities.

While certain embodiments have been described, these embodiments have been presented by way of example only, and are not intended to limit the scope of invention. Indeed, the novel apparatus, methods and computer readable mediums described herein may be embodied in a variety of other forms; furthermore, various omissions, substitutions and changes in the form of the apparatus, methods and computer readable mediums described herein may be made without departing from the spirit of the inventions. The accompanying claims and their equivalents are intended to cover such forms or modifications as would fall within the scope and spirit of the inventions.

What is claimed is:

1. A data reception processing apparatus comprising:
    a data receiving section configured to receive processing target data;
    plural data acquiring sections configured to respectively acquire only data received by communication employing acquisition target protocols separately set in advance for the data acquiring sections;
    a data-acquisition control section configured to control the plural data acquiring sections to cause the data acquiring section corresponding to the acquisition target protocol used for reception of data received by the data receiving section to more preferentially receive the data than data received by using the acquisition target protocol corresponding to priority lower than priority associated with the acquisition target protocol used for the reception of the data;
    a data output section configured to acquire the data from the data acquiring section and sequentially output the data to a processing section configured to process the;
    a reception-frequency calculating section configured to calculate a reception frequency for each of the acquisition target protocols of the data received by the data receiving section; and
    a priority setting section configured to set, on the basis of the reception frequency calculated by the reception-frequency calculating section, priority corresponding to the acquisition target protocol having a higher reception frequency higher.

2. The data reception processing apparatus according to claim 1, wherein the data-acquisition control section controls the data acquiring section not to acquire data until data acquisition processing by the data acquiring section corresponding to the acquisition target protocol with priority higher than the priority of the acquisition target protocol corresponding to the data acquiring section.

3. The data reception processing apparatus according to claim 1, wherein the plural data acquiring sections check, at timings set for the data acquiring sections in advance, whether data conforming to the acquisition target protocols respectively corresponding to the data acquiring sections is received by the data receiving section and, when the data is received, acquires the data.

4. The data reception processing apparatus according to claim 1, further comprising:
    a display control section configured to display a setting screen for setting priority for at least any one of the acquisition target protocols respectively corresponding to the plural data acquiring sections; and
    wherein the priority setting section is further configured to set priority for the acquisition target protocol on the basis of setting content designated on the setting screen.

5. The data reception processing apparatus according to claim 1, wherein the plural data acquiring sections divide the data received by the data receiving section into data having size equal to or smaller than an amount of data that is set in advance for each of the data acquiring sections and can be acquired and sequentially acquire the divided data separately in plural times.

6. The data reception processing apparatus according to claim 1, wherein
    the plural data acquiring sections acquires, in acquiring the data, data having size equal to or smaller than an amount of data having size equal to or smaller than an amount of data that is set in advance for each of the data acquiring sections and can be acquired, and
    the data-acquisition control section sets the amount of data that the data acquiring section can acquire larger than the amount of data of the data acquiring section corresponding to the acquisition target protocol with priority lower than the priority of the acquisition target protocol corresponding to the data acquiring section.

7. A data reception processing method comprising:
    receiving processing target data;
    acquiring, separately for each of acquisition target protocols set in advance, data received by communication employing the acquisition target protocols;
    controlling the received data to be more preferentially received than data received by using the acquisition target protocol corresponding to priority lower than priority associated with the acquisition target protocol used for communication of the data;
    acquiring the separately-acquired data and sequentially outputting the data for data processing;
    calculating a reception frequency for each of the acquisition target protocols of the received data; and
    setting, on the basis of the calculated reception frequency, priority corresponding to the acquisition target protocol having a higher reception frequency higher.

8. The data reception processing method according to claim 7, further comprising controlling data received according to the acquisition target protocol with lower priority not to be acquired until data acquisition processing for data received according to the acquisition target protocol with higher priority is completed.

9. The data reception processing method according to claim 7, further comprising checking, at timings set in advance for each of the acquisition target protocols, whether data conforming to the respective acquisition target protocols is received and, when the data is received, acquiring the data.

10. The data reception processing method according to claim 7, further comprising:

displaying a setting screen for setting priority for at least any one of the acquisition target protocols; and setting priority for the acquisition target protocol on the basis of setting content designated on the setting screen.

11. The data reception processing method according to claim 7, further comprising dividing the received data into data having size equal to or smaller than an amount of data that is set in advance for each of the data acquiring sections and can be acquired and sequentially acquiring the divided data separately in plural times.

12. The data reception processing method according to claim 7, further comprising:

acquiring, in acquiring the data, data having size equal to or smaller than an amount of data having size equal to or smaller than an amount of data that is set in advance for each of the data acquiring sections and can be acquired; and setting the amount of data larger than the amount of data corresponding to the acquisition target protocol with the lower priority.

13. An image forming apparatus comprising:

a data receiving section configured to receive processing target data;

plural data acquiring sections configured to respectively acquire only data received by communication employing acquisition target protocols separately set in advance for the data acquiring sections;

a data-acquisition control section configured to control the plural data acquiring sections to cause the data acquiring section corresponding to the acquisition target protocol used for reception of data received by the data receiving section to more preferentially receive the data than data received by using the acquisition target protocol corresponding to priority lower than priority associated with the acquisition target protocol used for the reception of the data;

a data output section configured to acquire the data from the data acquiring section and sequentially output the data to a processing section configured to process the data;

an image formation processing section configured to perform image formation processing on the basis of the data acquired from the data output section;

a reception-frequency calculating section configured to calculate a reception frequency for each of the acquisition target protocols of the data received by the data receiving section; and a priority setting section configured to set, on the basis of the reception frequency calculated by the reception-frequency calculating section, priority corresponding to the acquisition target protocol having a higher reception frequency higher.

14. The image forming apparatus according to claim 13, wherein the data-acquisition control section controls the data acquiring section not to acquire data until data acquisition processing by the data acquiring section corresponding to the acquisition target protocol with priority higher than the priority of the acquisition target protocol corresponding to the data acquiring section is completed.

15. The image forming apparatus according to claim 13, wherein the plural data acquiring sections check, at timings set for the data acquiring sections in advance, whether data conforming to the acquisition target protocols respectively corresponding to the data acquiring sections is received by the data receiving section and, when the data is received, acquires the data.

16. The image forming apparatus apparatus according to claim 13, further comprising:

a display control section configured to display a setting screen for setting priority for at least any one of the acquisition target protocols respectively corresponding to the plural data acquiring sections; and wherein the priority setting section is further configured to set priority for the acquisition target protocol on the basis of setting content designated on the setting screen.

17. The image forming apparatus apparatus according to claim 13, wherein the plural data acquiring sections divide the data received by the data receiving section into data having size equal to or smaller than an amount of data that is set in advance for each of the data acquiring sections and can be acquired and sequentially acquire the divided data separately in plural times.

18. The image forming apparatus apparatus according to claim 13, wherein the plural data acquiring sections acquires, in acquiring the data, data having size equal to or smaller than an amount of data having size equal to or smaller than an amount of data that is set in advance for each of the data acquiring sections and can be acquired, and the data-acquisition control section sets the amount of data that the data acquiring section can acquire larger than the amount of data of the data acquiring section corresponding to the acquisition target protocol with priority lower than the priority of the acquisition target protocol corresponding to the data acquiring section.

* * * * *